United States Patent
Wurmbäck

(10) Patent No.: US 9,962,995 B2
(45) Date of Patent: May 8, 2018

(54) BICYCLE TYRE

(71) Applicant: Continental Reifen Deutschland GmbH, Hannover (DE)

(72) Inventor: Christian Wurmbäck, Bad Zwesten (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days. days.

(21) Appl. No.: 15/323,862

(22) PCT Filed: May 27, 2015

(86) PCT No.: PCT/EP2015/061616
§ 371 (c)(1),
(2) Date: Jan. 4, 2017

(87) PCT Pub. No.: WO2016/015896
PCT Pub. Date: Feb. 4, 2016

(65) Prior Publication Data
US 2017/0136819 A1    May 18, 2017

(30) Foreign Application Priority Data
Jul. 30, 2014   (DE) .......................... 10 2014 214 892

(51) Int. Cl.
| | |
|---|---|
| *B60C 9/18* | (2006.01) |
| *B60C 11/00* | (2006.01) |
| *B60C 19/12* | (2006.01) |
| *B60C 15/00* | (2006.01) |
| *B60C 9/20* | (2006.01) |

(52) U.S. Cl.
CPC ............ *B60C 9/18* (2013.01); *B60C 15/0036* (2013.01); *B60C 2009/1878* (2013.01); *B60C 2009/2064* (2013.01); *B60C 2009/2067* (2013.01); *B60C 2200/12* (2013.01)

(58) Field of Classification Search
CPC .......... B60C 9/00; B60C 9/0042; B60C 9/18; B60C 9/1807; B60C 11/00; B60C 11/0041; B60C 2200/12
See application file for complete search history.

(56) References Cited

U.S. PATENT DOCUMENTS

| | | | | |
|---|---|---|---|---|
| 4,065,444 A | * | 12/1977 | Delaney .............. | C08F 236/045 152/450 |
| 2012/0175033 A1 | * | 7/2012 | Lavialle ................... | B60C 9/18 152/526 |

FOREIGN PATENT DOCUMENTS

| | | |
|---|---|---|
| EP | 0901915 A2 | 3/1999 |
| EP | 1384601 A1 | 1/2004 |
| EP | 1632364 A1 | 3/2006 |
| EP | 1918128 A1 | 5/2008 |

(Continued)

OTHER PUBLICATIONS

Abstract of Research Disclsoure (RD) 421059, May 1999.*
Chinese Office Action dated Aug. 30, 2017.

*Primary Examiner* — Justin R Fischer
(74) *Attorney, Agent, or Firm* — David L. Cate

(57) ABSTRACT

The invention relates to a bicycle tire with high riding comfort. A damping rubber insert (3) made from a highly elastic rubber is arranged between the tire tread (2) and the tire carcass. Said damping rubber insert (3) has a material thickness of between 0.2 and 2 mm, and the carcass insert ends (10) extend to a maximum of the lateral edge areas of the tire tread (2).

7 Claims, 1 Drawing Sheet

(56) References Cited

FOREIGN PATENT DOCUMENTS

| | | | |
|---|---|---|---|
| EP | 2666650 A1 | | 11/2013 |
| JP | 04163205 | * | 6/1992 |
| JP | 2001-10306 | * | 1/2001 |

* cited by examiner

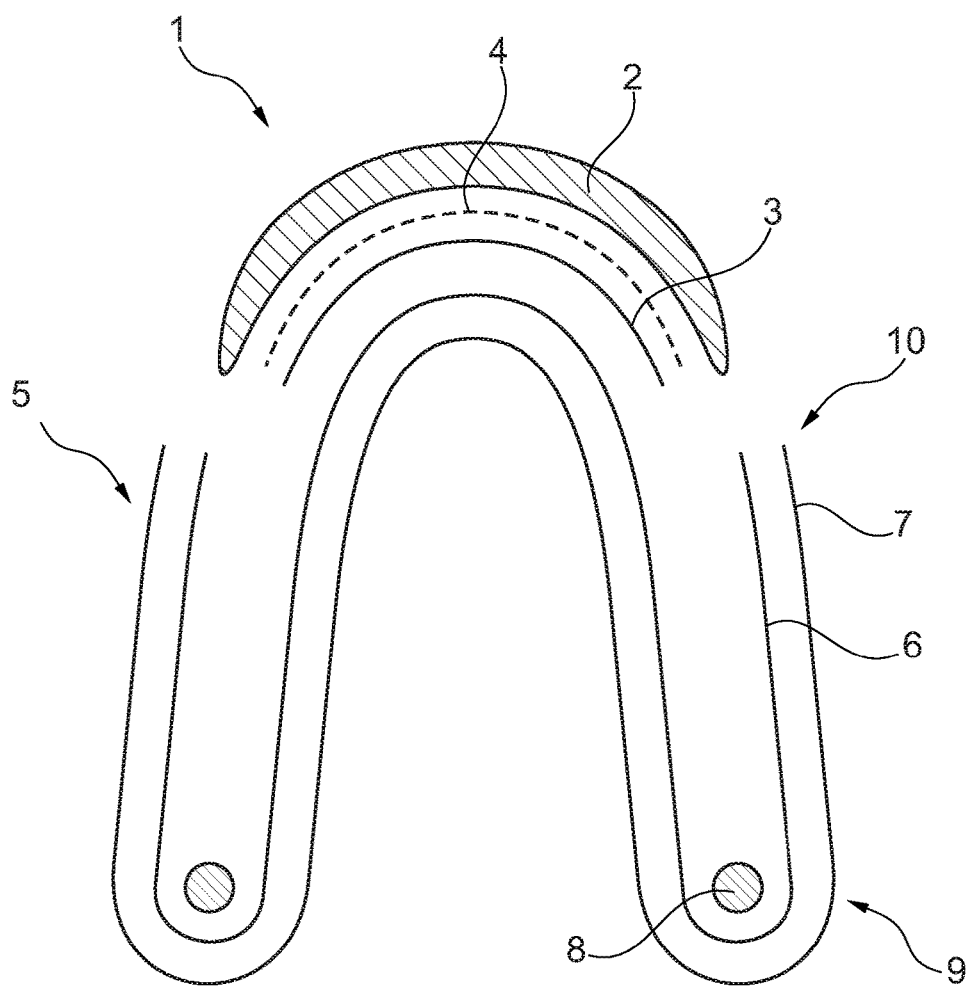

BICYCLE TYRE

The invention relates to a bicycle tire. Conventional bicycle tires, in particular racing bicycle tires, are specified and optimized in terms of rolling resistance, puncture protection, and service life. Racing bicycle tires are distinguished in that the carcass below the running strip is disposed in an overlapping manner. On account thereof, three layers of the carcass inlay lie on top of one another below the running strip. This rigid woven-fabric pack of the tire carcass below the running tread is unable to adapt to the respective ground while riding in an optimal manner. On account thereof, the tire during riding feels relatively rigid and uncomfortable.

The invention is based on the object of providing a bicycle tire in which in particular the ride comfort is improved.

The object is achieved, as per the preamble and the characterizing features of claim 1, in that a damping rubber inlay from a highly elastic rubber is disposed between the running strip and the tire carcass, wherein the damping rubber inlay has a material thickness between 0.2 and 2 mm, wherein the carcass inlay ends at maximum reach up to the lateral peripheral regions of the running strip.

One advantage of the tire according to the invention is to be seen in particular in that the ride comfort is significantly improved by way of the new tire construction of the bicycle tire. In the case of the new tire construction, a damping rubber inlay from a highly elastic rubber is disposed between the running strip and the tire carcass. The ride comfort of the bicycle tire is substantially improved due to the special material thickness of the damping rubber inlay, since the bicycle tire overall is better able to adapt to the ground of the carriageway. Moreover, the carcass inlay ends at maximum reach up to the lateral peripheral regions of the running strip. In this way, the tire carcass below the running strip has high elasticity, on account of which the ride comfort is likewise substantially improved. The new tire construction leads to a substantial improvement of the ride comfort in particular in the case of racing bicycle tires.

In one advantageous refinement of the invention it is provided that the tire carcass has two carcass inlays, lying on top of one another, wherein the side walls are reinforced and the rolling resistance is reduced by way of the carcass construction. The two carcass inlays, lying on top of one another, lead to a simplification in the manufacturing process of bicycle tires. Moreover, the rolling resistance of the bicycle tire may be reduced by way of this side-wall construction.

In one further advantageous refinement of the invention it is provided that the two carcass inlays, lying on top of one another, cover the entire side wall, and the carcass inlay ends terminate shortly below the lateral peripheral regions of the running strip. Optimal protection for the side wall is guaranteed in this way.

In one further advantageous refinement of the invention it is provided that the two carcass inlays, lying on top of one another, have individual strength members that run in parallel, wherein the strength members are disposed at an intermediate angle of 30 to 60 degrees, wherein the strength members of the two carcass inlays have mutually opposite inclination angles. On account thereof, the tire carcass overall has high rigidity.

In one further advantageous refinement of the invention it is provided that the damping rubber inlay has a material thickness between 0.3 and 1 mm. Optimum ride comfort is achieved at this material thickness, wherein the rolling resistance of the bicycle tire is not simultaneously increased.

In one further advantageous refinement of the invention it is provided that the damping rubber inlay is composed of a highly elastic rubber having a material rebound value between 70 and 80.

Optimum ride comfort is achieved at this material rebound value, wherein the rolling resistance of the bicycle tire is not simultaneously increased.

In one further advantageous refinement of the invention it is provided that a cut-resistant fibrous layer, in particular from polyester polyacrylate, from a cut-resistant woven fabric is disposed below the running strip. The cut-resistant fibrous layer guarantees optimum puncture protection for the bicycle tire.

In one further advantageous refinement of the invention it is provided that the bicycle tire is a racing bicycle tire and is operated at a minimum tire pressure of approx. 5.5 bar. This new tire construction may be particularly advantageously employed in racing bicycle tires, since the ride comfort is substantially increased.

The invention is to be explained in greater detail using one exemplary embodiment. The drawings show:

FIG. 1: a bicycle tire in the cross section.

FIG. 1 shows the relevant tire components of the bicycle tire in a cross-sectional view. The racing bicycle tire illustrated has two carcass inlays 6 and 7, lying on top of one another. The carcass inlay ends 10 are folded back over the core 8 on both sides, reaching so as to be shortly below the lateral regions of the running strip 2. The carcass inlay ends 10 cover the side wall of the racing bicycle tire in a substantially complete manner. Thus, four layers of the woven carcass fabric are disposed on top of one another in the region of the side wall, on account of which the side wall overall has a high rigidity. The damping rubber layer 3 which preferably has a material thickness between 0.3 and 1 mm is disposed below the running strip 2. The rubber inlay 3 covers the lower side of the running strip 2 in a substantially complete manner. Moreover, a cut-resistant fibrous layer 4 which in the FIGURE is illustrated as a dashed line is disposed below the running strip 2. The cut-resistant fibrous layer guarantees optimum puncture protection. In the case of the new tire construction the carcass inlay ends 10 do not reach below the running strip, on account of which the ride comfort of the racing bicycle tire is significantly improved. The damping rubber inlay 3 likewise contributes toward increasing the ride comfort.

LIST OF REFERENCE SIGNS

Part of the Description

1 Bicycle tire
2 Running strip
3 Damping rubber inlay
4 Cut-resistant fibrous layer (dashed line)
5 Side wall
6 First carcass inlay
7 Second carcass inlay
8 Core
9 Position of rim strip
10 Carcass inlay ends

The invention claimed is:
1. A bicycle tire consisting essentially of:
a running strip;
a polyester polyacrylate cut-resistant fibrous layer disposed inwardly adjacent the running strip;

a damping rubber inlay comprised of a highly elastic rubber disposed inwardly adjacent the polyester polyacrylate cut-resistant fibrous layer;

a tire carcass disposed inwardly adjacent the damping rubber inlay;

tire side walls; and, a tire bead comprising a core;

wherein the tire carcass comprises at least one carcass inlay, wherein the at least one carcass inlay is folded back over the core and terminates in the tire side walls, wherein the damping rubber inlay comprised of a highly elastic rubber is laid upon the at least one carcass inlay, and wherein ends of the at least one carcass inlay at maximum reach up to lateral peripheral regions of the running strip.

2. The bicycle tire as claimed in claim 1, wherein the tire carcass comprises two carcass inlays disposed on top of one another, wherein the tire side walls are reinforced, and wherein rolling resistance is reduced by way of carcass construction.

3. The bicycle tire as claimed in claim 1, wherein the tire carcass comprises two carcass inlays disposed on top of one another, wherein the two carcass inlay ends terminate below the lateral peripheral regions of the running strip.

4. The bicycle tire as claimed in claim 1, wherein the tire carcass comprises two carcass inlays disposed on top of one another, wherein the two carcass inlays each comprise individual strength members running in parallel, wherein the strength members are disposed at an intermediate angle of 40 to 60 degrees, and wherein the strength members have mutually opposite inclination angles.

5. The bicycle tire as claimed in claim 1, wherein the damping rubber inlay has a material thickness between 0.3 and 1 mm.

6. The bicycle tire as claimed in claim 1, wherein the bicycle tire is a racing bicycle tire operated at a minimum tire pressure of approximately 6.5 bar.

7. The bicycle tire as claimed in claim 1, wherein the polyester polyacrylate cut-resistant fibrous layer is formed from a cut-resistant woven fabric.

* * * * *